United States Patent

Kobayashi

Patent Number: 5,771,069
Date of Patent: Jun. 23, 1998

[54] IMAGE STABILIZING DEVICE

[75] Inventor: Takashi Kobayashi, Mitaka, Japan

[73] Assignee: Canon Kabushiki Kaisha, Tokyo, Japan

[21] Appl. No.: 232,860

[22] Filed: Apr. 25, 1994

Related U.S. Application Data

[63] Continuation of Ser. No. 882,041, May 13, 1992, abandoned.

[30] Foreign Application Priority Data

May 17, 1991 [JP] Japan .................................... 3-140602

[51] Int. Cl.$^6$ .................................................. H04N 5/228
[52] U.S. Cl. .............................................. 348/208; 396/55
[58] Field of Search ................................... 348/207, 208, 348/214; 354/70, 191, 400; 358/479; 396/55, 233

[56] References Cited

U.S. PATENT DOCUMENTS

| | | | |
|---|---|---|---|
| 2,829,557 | 4/1958 | Jensen | 359/556 |
| 2,959,088 | 11/1960 | Räntsch | 359/557 |
| 3,504,957 | 4/1970 | Heflinger et al. | 359/557 |
| 3,756,687 | 9/1973 | Shin et al. | 350/16 |
| 3,944,324 | 3/1976 | Tajima et al. | 350/16 |
| 4,713,697 | 12/1987 | Goton et al. | 358/222 |
| 4,731,669 | 3/1988 | Hayashi et al. | 348/208 |
| 4,862,277 | 8/1989 | Iwaibana | 348/208 |
| 5,020,890 | 6/1991 | Oshima et al. | 348/208 |
| 5,117,246 | 5/1992 | Takahashi et al. | 349/208 |
| 5,266,981 | 11/1993 | Hamada et al. | 348/208 |

FOREIGN PATENT DOCUMENTS 61-189778  8/1986  Japan ............................ H04N 5/232

Primary Examiner—Bipin Shalwala
Attorney, Agent, or Firm—Robin, Blecker & Daley

[57] ABSTRACT

In an imaging stabilizing device, a relative velocity component is detected between a barrel and a correction optical device movably supported with respect to the barrel. When an output signal thereon exceeds a predetermined value, or, when such a condition that the output signal exceeding the predetermined value is repeated predetermined times, a fixing device is actuated to fix the correction optical device with respect to the barrel.

23 Claims, 9 Drawing Sheets

IMAGE STABILIZING DEVICE

This is a continuation application under 37 CFR 1.62 of prior application Ser. No. 07/882,041, filed May 13, 1992 now abandoned.

BACKGROUND OF THE INVENTION

1. Field of the Invention

The present invention relates to an imaging stabilizing device provided with correction optical means movably supported with respect to a fixed member.

2. Related Background Art

There has been known an optical instrument having a function to prevent a vibration of image caused for example by a hand vibration.

For example, U.S. Pat. Nos. 2959088 and 2829557 disclose a system of anti-vibration of image by an inertia of correction optical system movably disposed.

FIG. 3 shows a structure of such an imaging stabilizing device. In FIG. 3, principal lenses 12, 13 are fixed to a lens barrel 4 as will be hereinafter called a barrel for forming an image on a focal plane 14, and lenses 1, 2 constitute a correction optical system for correction of image vibration. Focal lengths of the correction optical system are set to satisfy the following relation:

$$f1 = -f2,$$

where f1 is a focal length of lens 1 having a negative power and fixed to the barrel 4, and f2 a focal length of lens 2 having a positive power and supported by a movable supporting member 3.

The movable supporting member 3 is supported on the barrel 4 at a position of focal length f2 (=−f1) from an image principal point of lens 2 by a gimbal 5 for biaxially movable support.

FIG. 4 shows the biaxially movable support of the gimbal 5. The movable supporting member 3 holding the lens 2 is supported by a support member 5y having a freedom about the y-axis, the support member 5y is supported by a support member 5x having a freedom about the x-axis perpendicular to the y-axis, and the support member 5x is supported by the barrel 4, constituting the correction optical system having biaxial rotation freedoms.

In FIG. 3, referential numeral 10 is a counter weight as a balancer to balance the movable supporting member 3, which is attached to an end of the movable supporting member 3 on the side opposite to the lens 2 with respect to the gimbal 5, whereby balancing the movable supporting member 3 to the lens 2 with respect to the gimbal 5.

The above arrangement provides an anti-vibration optical system of so-called inertia pendulum type. The anti-vibration of the image is effected as follows according to the arrangement as shown in FIG. 3.

Suppose the apparatus as shown in FIG. 3 is a telescope. An optical image of an object is focused on the focal plane 14 by the principal lenses 12, 13 and the correction optical system 1, 2 inside the barrel 4 is directed towards the object. In case that a telescope with a high magnification is held by hand, hand vibrations cause vibrations of frequency between 0.1 and 10 Hz in the barrel 4, resulting in vibration of the image.

In the above optical mechanism, a relative deviation takes place between the lens 2 and the lens 1 due to the inertia of movable supporting member 3 upon the vibration, so that the vibration of the image may be restricted by the relative deviation between the lenses 2 and 1.

In FIG. 3, a member 9 of non-magnetic conductive substance such as aluminum is attached to the movable supporting member 3 and produces a magnetic effect in combination with magnets 6, 7 secured to the barrel 4 to create a restricting or damping force in correspondence to a vibration velocity of the barrel 4. The damping is supposed to prevent the movable supporting member 3 from hitting an internal wall of barrel 4 upon a sudden change of the barrel 4 for view field change.

In more detail, the damping is effected by a force to decrease an amount of deviation of the movable supporting member 3 from a central position of movement where the optical axis of lens 2 is coincident with the principal optical axis 15 of principal lenses 12, 13, which is produced by eddy current in the conductive substance 9 with the magnets 6, 7 as enlarged in FIG. 5.

FIG. 5 shows only the upper magnets 6, 7 on the barrel 4. Further magnets are provided on the bottom, the left, and the right sides in the barrel 4 for biaxial control though omitted in FIG. 5 for simplification and convenience of explanation.

In FIG. 3, referential numeral 11 denotes a magnetic substance attached to the movable supporting member 3 in unity with the counter weight 10. The magnetic substance 11 produces a magnetic effect with the magnet 8 secured to the barrel 4 to effect centering or returning of the movable supporting member 3 to the center of movement where the optical axis of lens 2 coincides with the principal optical axis 15. Removed by this centering are production errors and a DC component in the frequency components of deviation while the optical axis of the lens 2 is made coincident with the principal optical axis 15, because optical properties are excellent at the central portion of lens 2 if no vibration is given.

Specifically, the magnetic substance 11 and the magnet 8 face each other in the same pole (N pole) to magnetically repel each other as shown in the enlarged drawing of FIG. 5. Since the center of the magnet 8 is coincident with the principal optical axis 15, a centripetal force or centering force is generated to force the optical axis of lens 2 to coincide with the principal optical axis 15.

As explained above, the damping and the centering improve properties of imaging stabilizing device of an inertia pendulum type.

Frequent operations during actual photographing are panning, which is horizontal movement of barrel 4 for view field change, and tilting, which is vertical movement of barrel 4 for view field change, to track a subject or to change a subject.

The above-described arrangement is a system for anti-vibration, effective to hand vibrations, but reduces the anti-vibration effect on more realistic panning and tilting of one-directional continuous movement. Further, the correction optical system is possibly shifted to sit at a largely deviated position, or to collide with the internal wall of barrel 4, causing unnatural movement of the image.

Applicant has filed an application of U.S. Ser. No. 516,303 in 1990 to disclose a device enabling anti-vibration upon the panning and the tilting in the image vibration correction system. FIG. 6 shows a structure of the imaging stabilizing device as disclosed in the application, which is of the inertia pendulum type similar to that of FIG. 3. The same elements as in FIG. 3 are given the same numerals in FIG. 6, therefore omitting further explanation.

In FIG. 6, a main image pick-up optical system is constituted by a front lens 91, a variable power lens 92, and fixed lenses for image formation 93, 94. The variable power lens 92 is movably disposed through a variable ring 96 for focal length change. A movement position of the variable power lens 92 is detectable by a variable power encoder as will be hereinafter represented by ENC. An output of ENC 95 provides information about a condition of focal length of a photographic optical system. Incidentally, the ENC 95 is of 2 bit optical reflection type in FIG. 6.

Sensors 30, 31, 32 are disposed on the internal wall of barrel 4 and on the movable supporting member 3, and torque generators 41, 42, 43 at positions of axial symmetry thereof. An arrangement in the y-axis is similar to that in the x-axis, and the x-axis is located perpendicular to the y-axis.

FIG. 8 shows a structure of a sensor.

The sensor is composed of a light emitting element 30 such as LED attached to the internal wall of barrel 4, a power source 34 for the light emitting element 30, a line light acceptance position detecting element 32 such as PSD to receive the light emitted from the light emitting element 30, and a slit screen 31 attached to the movable supporting member 3.

The slit screen 31 is provided between the light emitting element 30 and the line light acceptance position detecting element 32 to move in a direction of arrow as shown with movement of the movable supporting member 3 holding the lens 2 as being the correction optical system. Upon the movement, a signal is detected in correspondence to the deviation angle by the light acceptance position detecting element 32, and a sensor amp 33 outputs a deviation signal of the movable supporting member 3 with respect to the barrel 4.

FIG. 9 shows an example of the torque generator of a voice coil type.

The torque generator comprises a voice coil 42 attached to the internal wall of barrel 4 and a magnet 41 attached to the movable supporting member 3.

When a control signal is input into an input terminal 43, there is generated a magnetic coupling force or magnetic repelling force between the voice coil 42 and the magnet 41 in correspondence to an amount of electric current and a polarity, to generate a torque in a direction of arrow in FIG. 4.

As described before, the sensors 30, 31, 32 and the torque generators 41, 42 are arranged such that the x-axis and the y-axis are perpendicular to each other. They carry out the damping and the centering of movement of movable supporting member 3 together with the gimbal support by the torque control of movable supporting member 3 about the x-axis and about the y-axis.

FIG. 7 shows a block diagram to show a control system, into which the output of the sensor amp 33 is input, and which controls the drive of voice coil 42 in correspondence to a deviation state of the movable supporting member 3 with respect to the barrel 4 for torque control of the movable supporting member 3 about the x-axis and about the y-axis.

In FIG. 7, the deviation signal about the movable supporting member 3 to the barrel 4 about the x-axis and about the y-axis of the moving supporting member 3, which is supplied from the sensor amp 33, is converted into digital data by an A/D converter 511 in the control circuit 50 comprising a micon, and processed therein. In FIG. 7, the sensors for torque about the x-axis of the movable supporting member 3, including the members 33, 34 as well as 30–32, are designated by 30$x$, 31$x$, 32$x$, 33$x$, 34$x$, and the sensors for torque about the y-axis by 30$y$, 31$y$, 32$y$, 33$y$, 34$y$.

The thus A/D converted signal is processed as later detailed, and then converted into analog data by a D/A converter 519 to be output from the control circuit 50. Drive circuits 53$x$, 53$y$ control driving of the torque generators 41, 42 based on the analog data. In FIG. 7, the torque generators are designated by 41$x$, 42$x$ for torque about the x-axis of the movable supporting member 3, and by 41$y$, 42$y$ for torque about the y-axis.

The fundamental control of the control circuit 50 is that the torque generators 41$x$, 42$x$ and 41$y$, 42$y$ generate a non-linear control torque for damping and centering against a deviation of movable supporting member 3 of inertia pendulum to the barrel 4 in order to satisfy the two counter requirements, one of which is the anti-vibration, and the other of which is the prevention of excessive movement of the lens part upon panning or tilting.

FIG. 10 shows an example of characteristics curve of control torque.

As seen from the control torque curve of FIG. 10, when the movable supporting member 3 is located around the center of movement, the torque generators 41$x$, 42$x$ and 41$y$, 42$y$ generate little torque for damping to keep the anti-vibration effect of the inertia pendulum.

In contrast, when the barrel 4 is moved much in one direction upon panning, i.e. horizontal movement of barrel 4 for view field change, or upon tilting, i.e. vertical movement of barrel 4 for view field change, that is, when the movable supporting member 3 is largely deviated from the center of movement through the function of inertia pendulum, the torque generators 41$x$, 42$x$ and 41$y$, 42$y$ exponentially increase the centering and the damping forces to return the movable supporting member 3 to the center of movement with increase of deviation amount to prevent the movable supporting member 3 from hitting the internal wall of the barrel 4.

FIG. 11 shows an image of the torque curve of FIG. 10 as seen on the principal optical axis 15 of the pendulum.

A concentric circle represents a constant amount of torque in FIG. 11. It is seen that a spacing between two concentric circles becomes closer as approaching the periphery or wall of the barrel 4, so that an inclination of torque property becomes steep as the movable supporting member 3 is deviated from the center of movement. That is, FIG. 11 shows the increase of torque along the non-linear curve as shown in FIG. 10.

The centering and damping torque is thus controlled, so that the movable supporting member 3 may be prevented from hitting the internal wall of barrel 4 with the centering and the damping increasing as the movable supporting member 3 comes close to the barrel 4. The centering and the damping are kept as low as possible except upon close approach in order to keep the anti-vibration of the inertia pendulum.

The control circuit 50 achieves such control property of FIG. 10 as follows. The control circuit 50 calculates a control function DATA as described below and makes the torque generators 41$x$, 42$x$ and 41$y$, 42$y$ generate the control torque of DATA.

$$DATA = K1*\theta + K2*d\theta/dt + K3*\int \theta dt,$$

where K1, K2, K3 are coefficients, and * is multiplication. The control circuit 50 selects the coefficients K1, K2 from look-up tables (as will be hereinafter referred to as LUT) 513, 514 stored in a memory in the control circuit 50 so as to obtain the torque curve of FIG. 10 in correspondence to a deviation amount or deviation angle $\theta$ of movable supporting member 3 input from the sensor amps 33$x$, 33$y$. The coefficient K3 is a constant small value.

In the above control function, the term "K1* $\theta$" is obtained by the LUT 513, a synthesizer 520, and a multiplier 516 in FIG. 7, serving as a spring term to generate a centering force in correspondence to a deviation amount of movable supporting member 3 from the center of movement. The term "K2* dθ/dt" is a damping term obtained by the LUT 514, a synthesizer 521, a multiplier 517, and a differentiator 515 in FIG. 7, to have restricting effect against sudden panning or tilting. The term "K3* ∫θdt" is obtained in an integrator 512 for centering to effect the return of movable supporting member 3 to the center of movement by cancelling errors caused by various factors such as accumulative error and production errors upon mass production. The integration sets lower in influence on the control system without non-linear treatment as is the case in the other terms.

The obtained terms are added in an adder 518 in FIG. 7, the addition result is converted into analog data at the next D/A converter 519, and the analog data is output through the drive circuits 53x, 53y to the torque generators 42x, 42y.

In the control circuit 50 of FIG. 7, an arrangement in a portion framed by a broken line 52 is the same as that in the portion framed by a broken line 51 except the coefficient data in the LUTs 513, 514. Therefore, the arrangement in the portion framed by the broken line 52 is omitted in FIG. 7 for simplification. In the arrangement framed by the broken line 51, the elements between the integrator 512 and the adder 518 represent processing contents of control circuit 50 like hardware.

The control torque is higher upon telephoto than upon wide angle in correspondence to the output of variable power encoder or ENC 95 in this example. FIG. 13 shows such torque curves, in which the control torque curve is changed as (c)→(b)→(a) to obtain a stronger torque in the non-linear property as the focal length of photographic optical system changes from the telephoto end of longer focal length to the wide angle end of shorter focal length.

There are set in the LUTs 513, 514 in the control circuit 50 the coefficients K1, K2 of the control function in correspondence to the deviation angle θ of the movable supporting member 3 for the torque curve (a) at the wide angle end and those for the torque curve (c) at the telephoto end. These coefficients are selected in correspondence to the deviation angle θ of the movable supporting member 3, and the synthetic calculation is conducted for coefficients K1, K2 of the control function to obtain the torque curve as described in correspondence to the value of ENC 95.

It is known that hand vibrations are outstanding upon telephotography by hand holding as compared to upon wide angle photographing. Thus the above arrangement is for greater movement upon panning or tilting, which optimizes the control torque to fit a use condition of an optical instrument for example by weakening the torque property upon the telephotography than upon the wide angle photographing to obtain proper anti-vibration effect, because the control torque itself is against the original purpose of anti-vibration.

By this, the entire anti-vibration optical system may be made compact and light without loss in anti-vibration property near the telephoto end.

Below explained with reference to a flow chart of FIG. 12 is an operation of the control system of FIG. 7 executing the imaging stabilization.

Step 1: A value of ENC 95 (ENC data) is read to detect the focal length.

Step 2: Mode i is designated to x to process an operation of control torque signal about the x-axis of the movable supporting member 3.

Step 3: LUT selection mode j is set to 1 to select the coefficients of the control function memorized in the LUT.

Step 4: An output of sensor amp 33x, which is in correspondence to a deviation angle θ of movable supporting member 3 about the x-axis (as will hereinafter be referred to as θx), is taken into the A/D converter 511 to obtain digital data.

Step 5: In accordance with the LUT selection mode j=1 in Step 3, coefficients K1W, K1T are read out in correspondence to the above deviation angle θx from LUT-1x-W and LUT-1x-T storing the coefficient K1 of the control function to obtain the control torque curve (a) upon the wide angle and the control torque curve (c) upon the telephoto as shown in FIG. 13 for about the x-axis of movable supporting member 3.

Step 6: A coefficient K1 of control function for a current focal length is obtained by the synthetic calculation in correspondence to the value of the above-mentioned ENC 95 for the coefficients K1W and K1T.

An example of the synthetic calculation is shown in FIG. 14 like hardware.

In FIG. 14, the synthesizer 520 comprises coefficient generator 81 for generating a coefficient e in correspondence to a resolution of ENC 95, a computing element 82 for calculating a complement to 1, (1−e), multipliers 83, 84 for calculating "K1T * e" and "K1W * (1−e)", and an adder 85 for adding the outputs of multipliers. The synthesizer 520 outputs the coefficient K1 in correspondence to the focal length from the adder 85. The synthesizer 521 has the same arrangement as that 520.

The synthesizers may be omitted by using the same number of LUTs as the number of steps (resolution) of ENC in correspondence to the output of ENC 95.

Step 7: It is judged whether the process is completed for the setting of LUT selection mode j of 1 and 2. If the process is not completed, the flow goes to Step 8.

Step 8: The LUT selection mode j is set to 2 and the flow returns to Step 5. In accordance to the setting of LUT selection mode j=2, the coefficients K2W and K2T are read out in correspondence to the above θx from the LUT-2x-W and LUT-2x-T storing the coefficient K2 of control function, which may provide the control torque curve (a) upon the wide angle and the control torque curve (c) upon the telephoto as shown in FIG. 13 for about the x-axis of movable supporting member 3. At Step 6, a coefficient K2 of control function is obtained by the above-described synthetic calculation.

Step 9: The angle θx is differentiated to obtain dθx/dt, which is designated by data Δ.

Step 10: The angle θx is integrated to obtain ∫θxdt, and the integration result is multiplied by the coefficient K3, obtaining data d1.

The coefficient K3 is set to a constant small number of weight less influence on the control system as described above without non-linear treatment as is effected on the other coefficients K1, K2.

Step 11: The angle θx is multiplied by the coefficient K1, obtaining data d2.

Step 12: The data Δ is multiplied by the coefficient K2, obtaining data d3.

Step 13: The above data d1, d2, d3 are added to obtain "DATA", which is temporarily stored.

The calculation result of control function is obtained at this step as follows.

$$\begin{aligned} DATA &= d1 + d2 + d3 \\ &= K1 * \theta x + K2 * d\theta x/dt + K3 * \int \theta x dt \end{aligned}$$

Step 14: It is judged whether the current process mode i is for about the x-axis of movable supporting member 3. If the mode i is an odd number, it is for about the x-axis, which is the case of NO. Then Step 15 is processed. On the contrary, if the mode i is an even number, it is for about the y-axis, which is the case of YES. Step 17 is processed in this case.

Step 15: The calculation result "DATA" is stored in Dx as the control torque data about the x-axis.

Step 16: The process mode i is changed into y, and the flow returns to Step 2. Then the same processes as about the x-axis are effected for calculation of control torque signal about the y-axis of movable supporting member 3.

At Step 5 in this case, the coefficients K1W and K1T are read out in correspondence to a deviation angle θ (as will be hereinafter referred as θy) about the y-axis of movable supporting member 3 from the LUT–1y–W and LUT–1y–T storing the coefficient K1 to obtain the control torque curve (a) for wide angle end and the control torque curve (c) for telephoto end as shown in FIG. 13 about the y-axis of movable supporting member 3, and the coefficients K2W and K2W in correspondence to the deviation angle θy from the LUT–2y–W and LUT–2y–T storing the coefficient K2 of control function to obtain the control torque curve (a) for wide angle end and the control torque curve (c) for telephoto end as shown in FIG. 13.

Step 17: The calculation result "DATA" is stored in Dy as the control torque data for about the y-axis.

Step 18: The control torque data Dx and Dy are converted into analog data by the D/A converter 519. The converted analog data are output as deviation angle data or torque control signal to the drive circuits 53x, 53y for torque control about the x-, y-axes of movable supporting member 3.

Step 19: It is judged whether the imaging stabilizing operation should be concluded. If concluded, or if yes, the serial operation is completed. Otherwise, or if no, the flow returns to Step 1 to repeat the above processes until completion of the operation.

As explained, the non-linearly increased torque is generated in accordance with the torque curves of control function to provide a stronger torque as the focal length changes from the telephoto to the wide angle side. The torque is non-linearly increased to return the movable supporting member 3 to the center of movement by the torque generators 41x, 42x about the x-axis and the torque generators 41y, 42y about the y-axis as the movable supporting member 3 approaches the internal wall of barrel 4 upon panning or upon tilting. This effectively returns the movable supporting member 3 to the center of movement.

There are, however, the following problems found in the above-described example. If one swings one's hand holding the apparatus or if one runs holding the apparatus while the imaging stabilizing function is operated, the correction optical system of the pendulum type frequently goes into the area near the barrel wall, where a greater torque is applied thereon for centering. An increased electric current must be applied to the torque generators to obtain such greater torque, which is contrary to the goal of saving power.

In addition, when the swinging of apparatus is so severe to make the correction optical system of pendulum hit the barrel, hard impact shock may possibly break the correction optical system.

SUMMARY OF THE INVENTION

One aspect of the present invention is an imaging stabilizing device comprising correction optical means movable relative to a fixed member, vibration detecting means, and fixing means for fixing the correction optical means to the fixed member, in which the fixing means is operated in correspondence to an output of detecting means to prevent excessive power consumption as well as breakage of correction optical means.

DETAILED DESCRIPTION OF THE PREFERRED EMBODIMENTS

Figure 1:
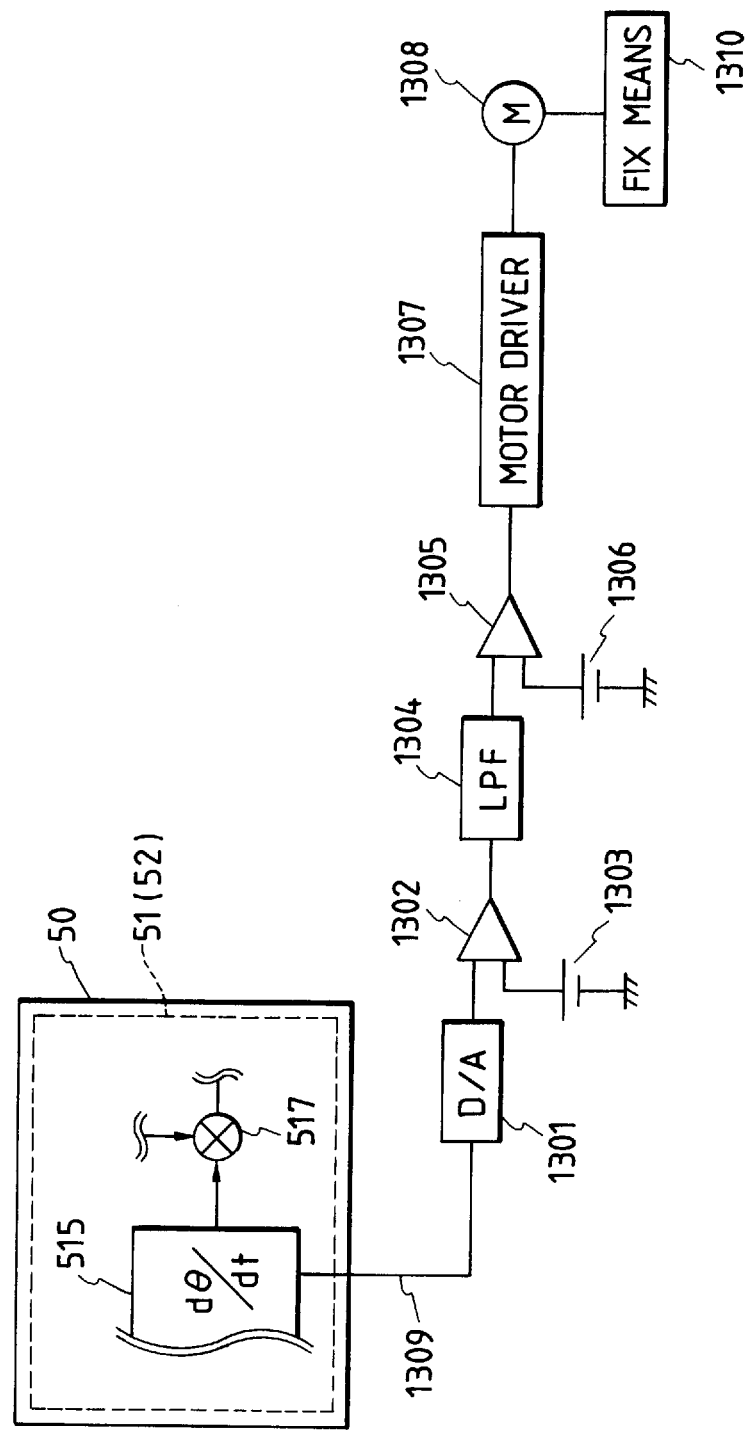
FIG. 1 is a block diagram to show a structure of the main part in an embodiment of the apparatus according to the present invention.
Figure 7:
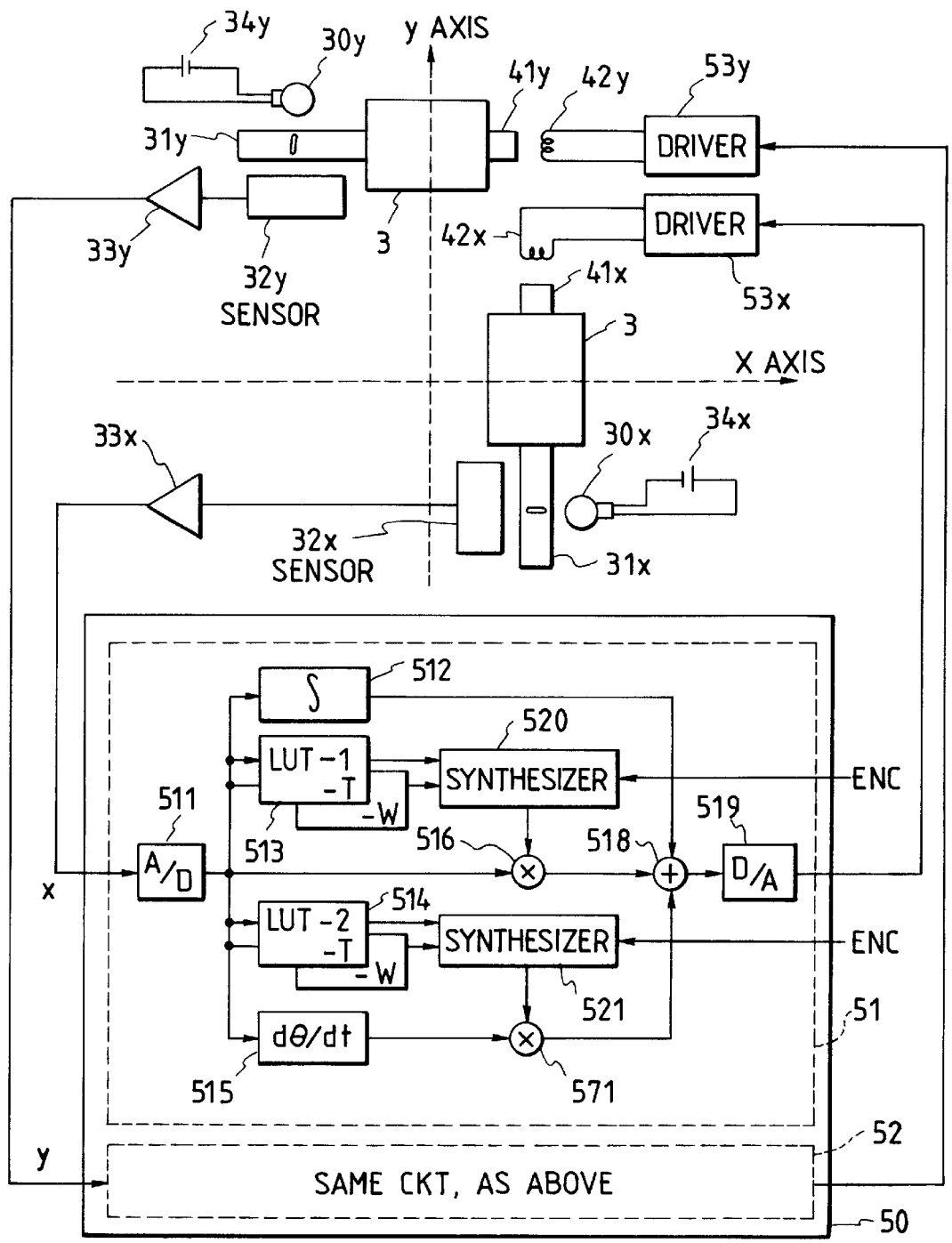
FIG. 7 is an electric block diagram of the imaging stabilizing device of FIG. 6.
Figure 8:
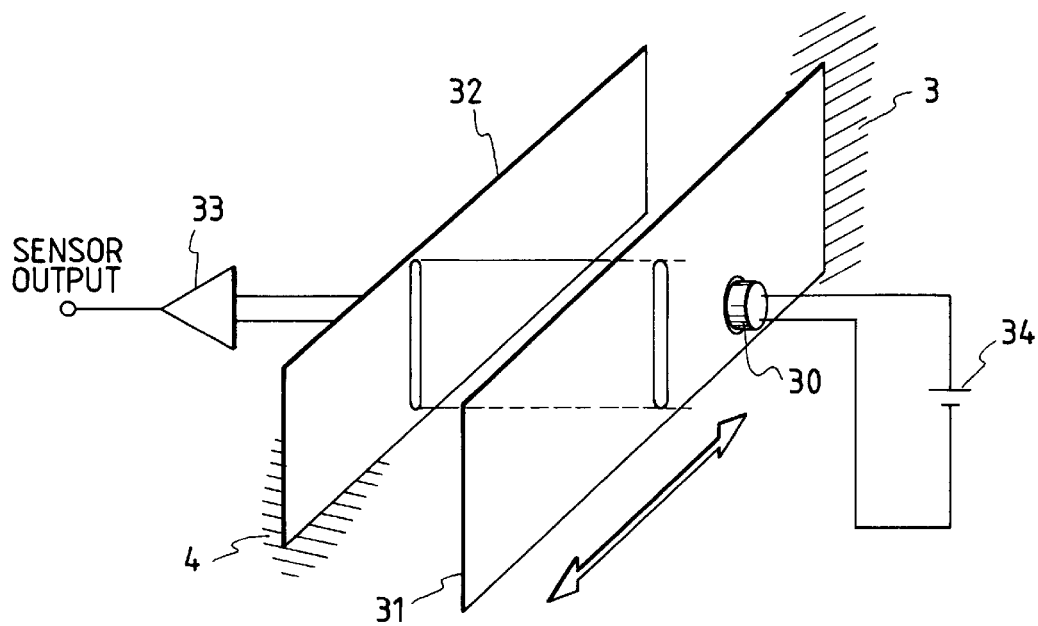
FIG. 8 is a perspective view to show a specific arrangement of a sensor as shown in FIG. 6.
Figure 9:
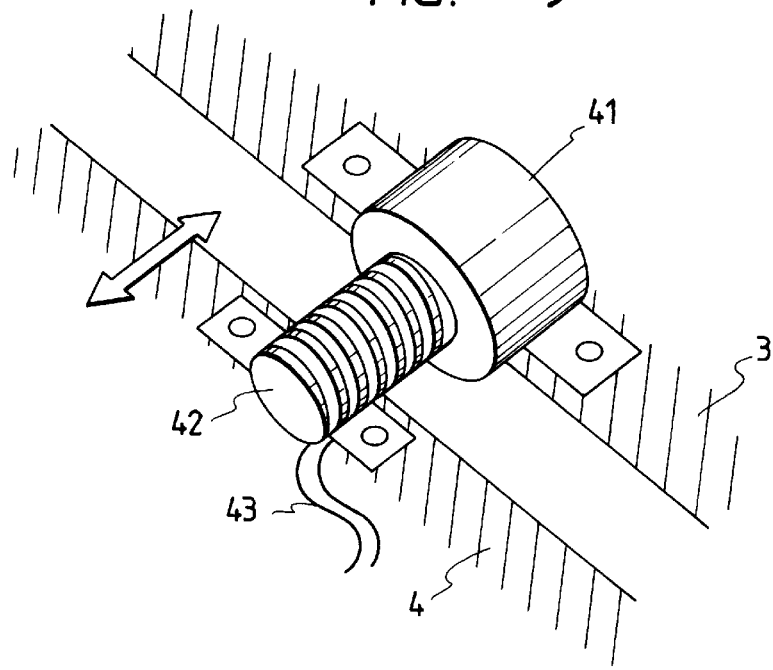
FIG. 9 is a perspective view to show a specific arrangement of a torque generator as shown in FIG. 6.
Figure 10:
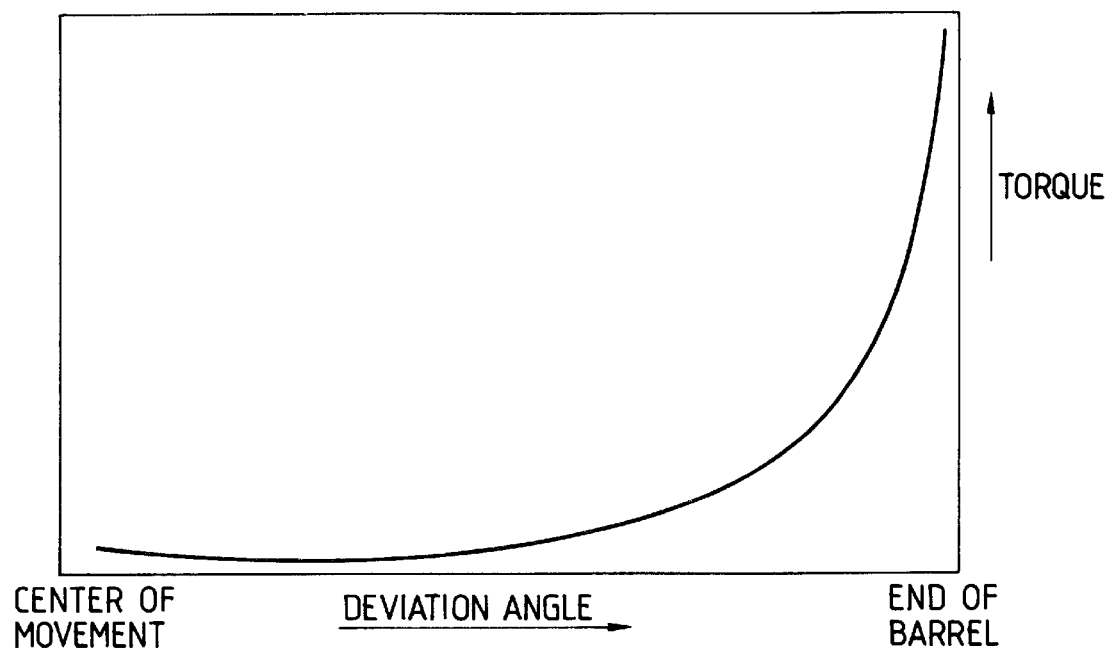
FIG. 10 is a torque characteristic chart as a basis of control system of FIG. 7.
Figure 11:
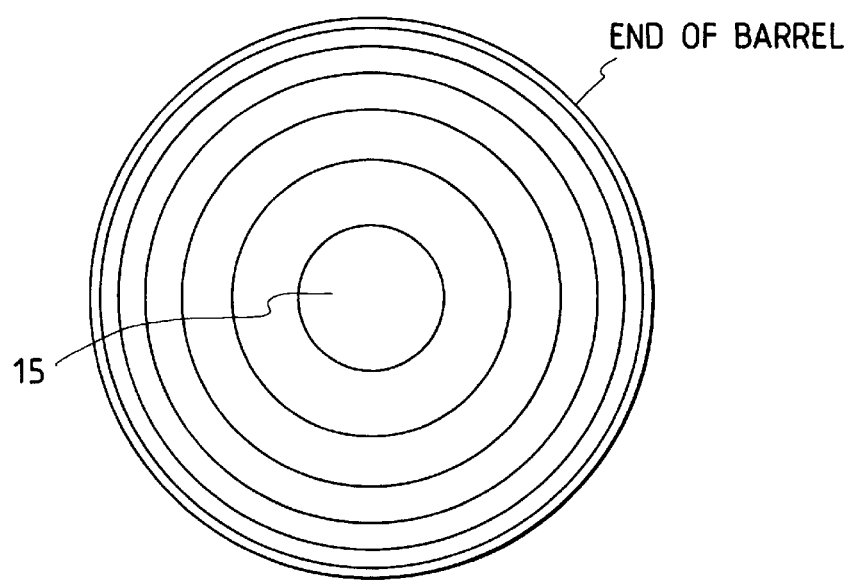
FIG. 11 is an image chart of torque control as shown in FIG. 10, which is seen on a principal optical axis.
Figure 12:
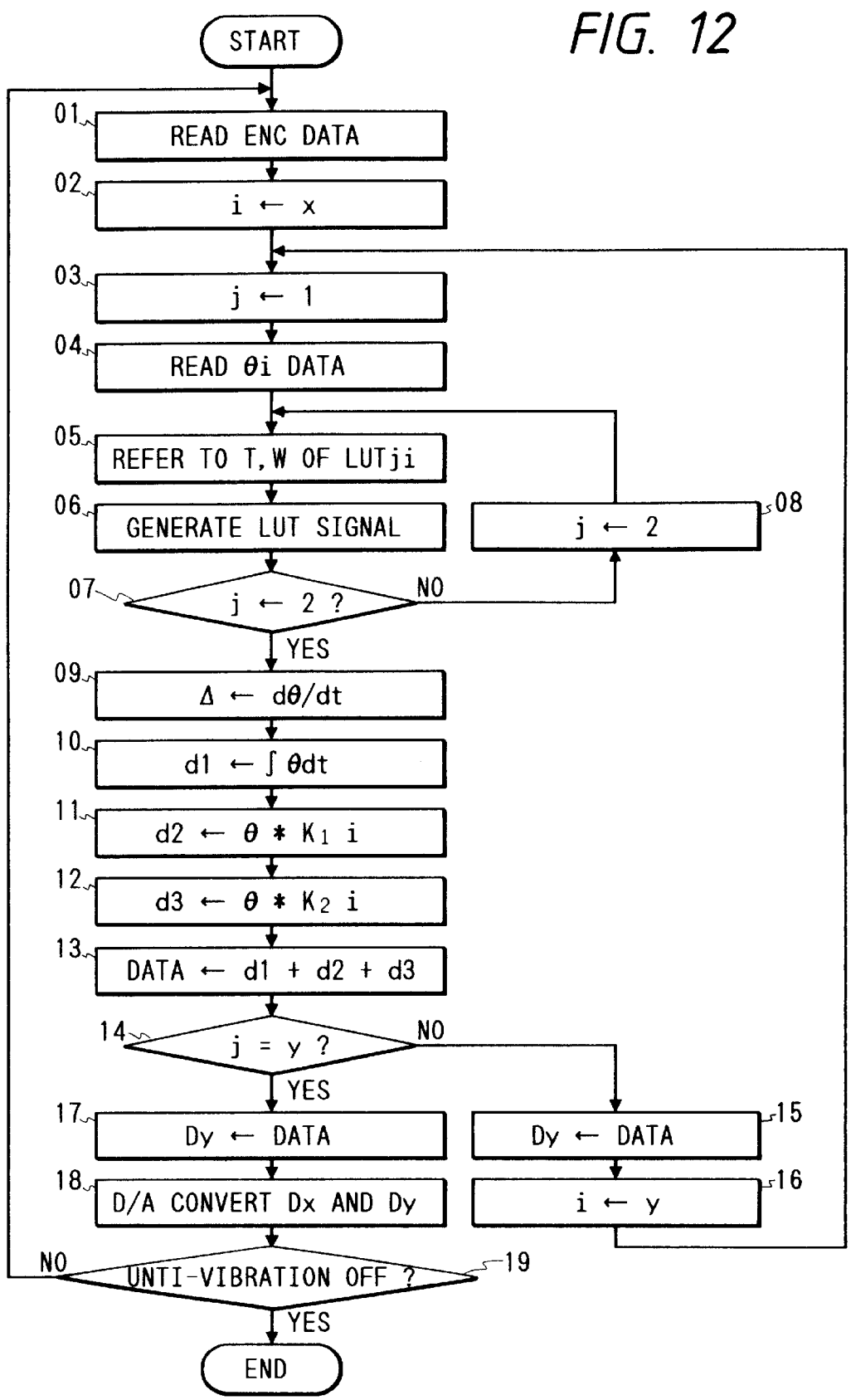
FIG. 12 is a flow chart to show an operation of the control circuit of FIG. 7.
Figure 13:
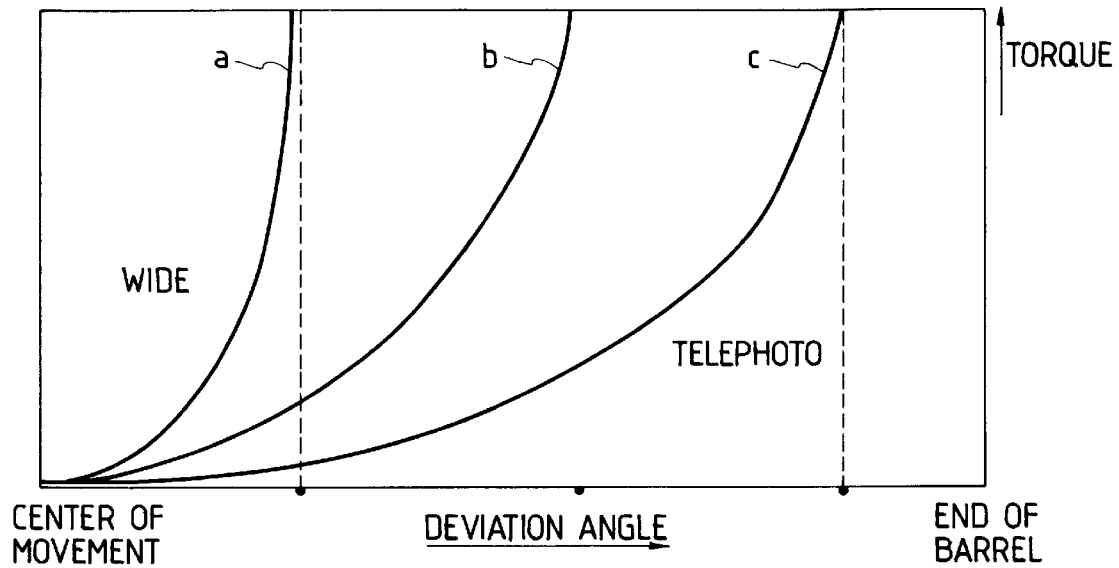
FIG. 13 is a torque characteristic chart to show torque characteristics differed in correspondence to a focal length, which is employed in the control circuit of FIG. 7.
Figure 14:
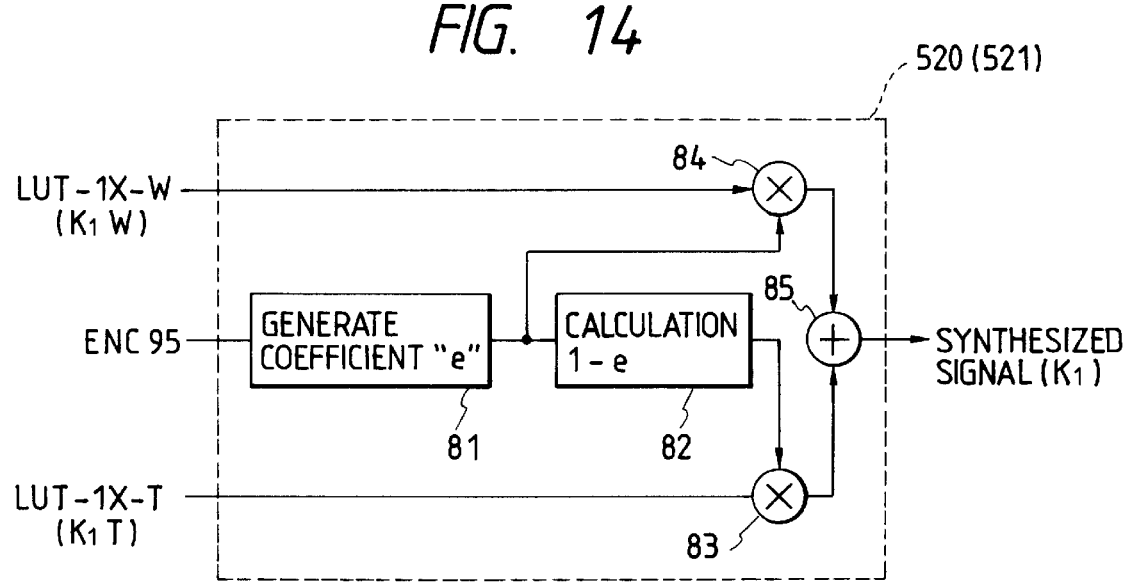
FIG. 14 is a circuit diagram to show a specific structure of the synthesizer of FIG. 7.

FIG. 1 is a block diagram to show a structure of the main part of the embodiment according to the present invention. The same elements as in FIG. 7 are given the same referential numerals as in FIG. 1.

In the present embodiment, a D/A converter 1301 receives through an output line 1309 a differentiation value of a relative angle between a correction optical system of a pendulum type, which is correction optical means, and a barrel, which is a fixed member, that is, an output of vibration detecting means (output of differentiator 515) out of a control circuit 50. The differentiation value of the relative angle is a signal of relative velocity between the correction optical system of the pendulum type and the barrel. The relative velocity signal is converted into an analog signal by the D/A converter 1301, and the analog signal is compared by a comparator 1302 with a predetermined voltage applied by a power source 1303. The predetermined voltage generated in the power source 1303 is set to a voltage equivalent to an output voltage from the D/A converter 1301 upon swinging the main apparatus or upon running with the main apparatus.

The comparator 1302 normally outputs "L", but outputs "H", for example upon swinging of the main apparatus, because the relative velocity signal between the barrel and the correction optical system of pendulum type output from the D/A converter 1301 reaches the predetermined voltage generated in the power source 1303. The output signal is input into a low pass filter 1304 to be smoothed, becoming information on swinging. The swinging information is compared by a comparator 1305 with a predetermined voltage applied by a power source 1306. If the output of the low pass filter 1304 is greater than the predetermined voltage, the comparator 1305 outputs "H". Otherwise, the comparator outputs "L". In other words, in case that a state of high relative velocity between the correction optical system of the pendulum type and the barrel is repeatedly continued more than predetermined times by swinging the main apparatus, the output of comparator 1305 becomes "H". Then the signal is input into a motor driver 1307, and the motor driver 1307 drives a motor 1308 attached to fixing means 1310 to fix the correction optical system of the pendulum type to the barrel of the support member thereof.

Figure 2A:
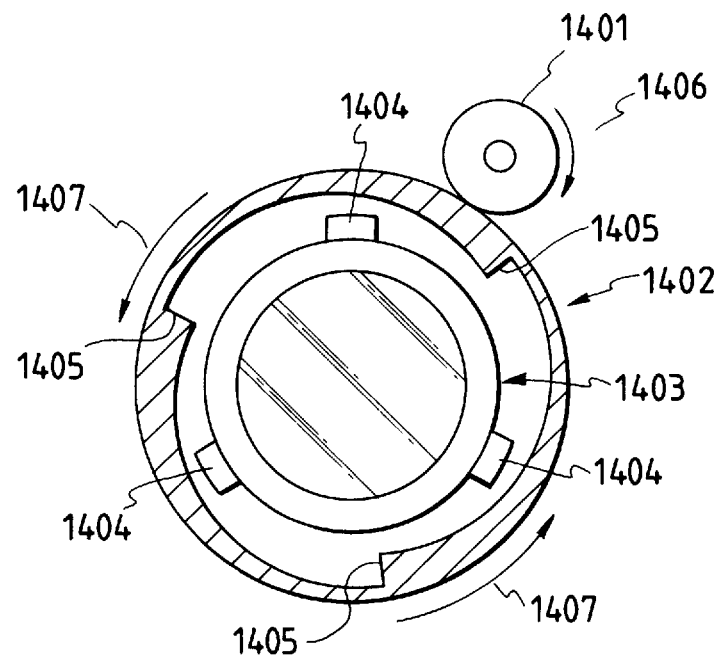
FIGS. 2A and 2B are sectional views to illustrate a specific arrangement and an operation of fixing means of FIG. 1.
Figure 2B:
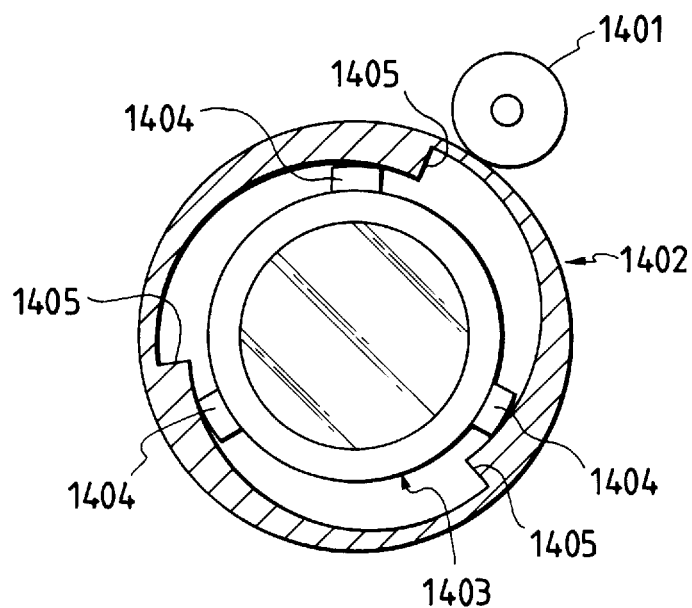
Figure 3:
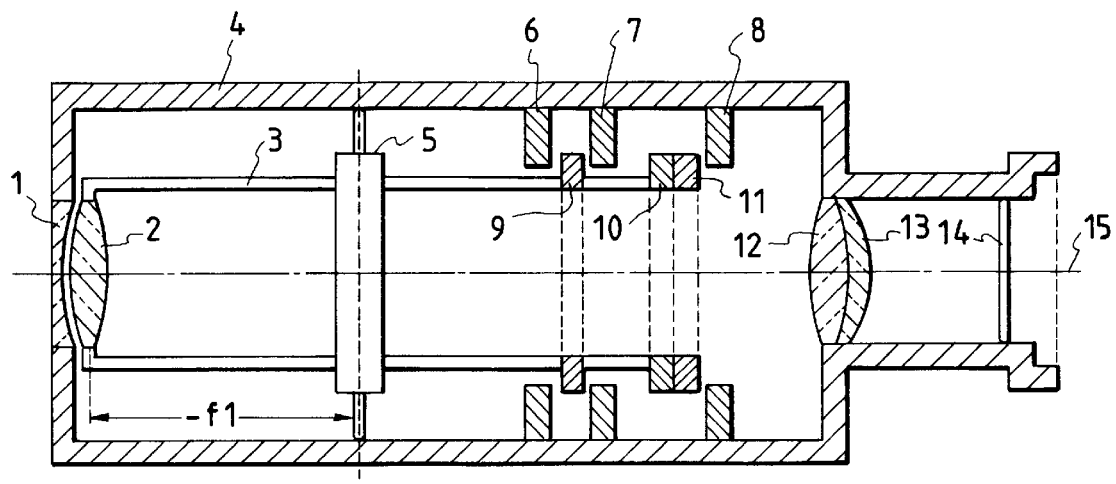
FIG. 3 is a sectional view to show a structure of a conventional imaging stabilizing device.
Figure 4:
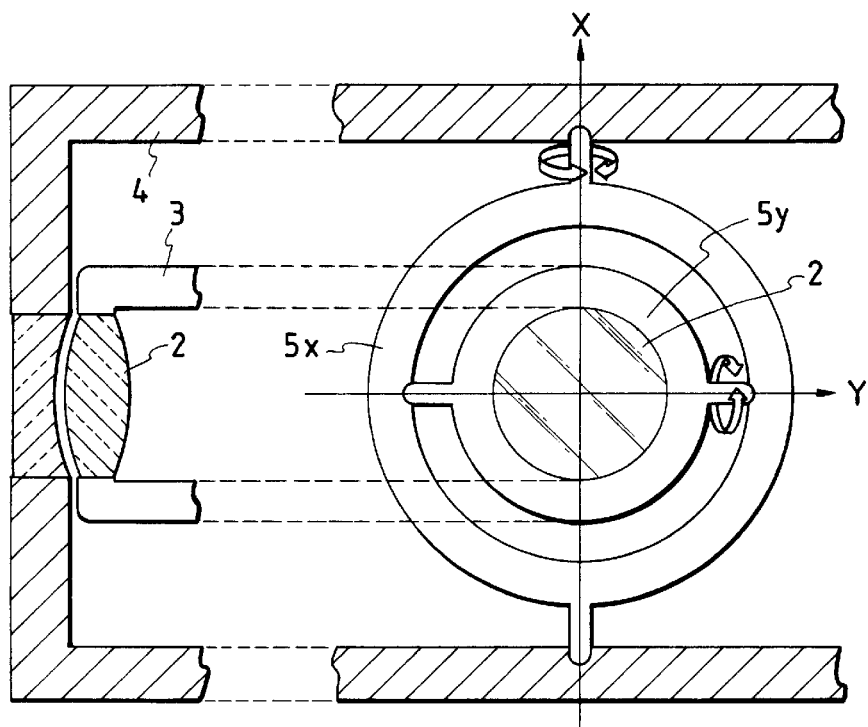
FIG. 4 is a partly enlarged drawing to illustrate a structure of gimbal support of FIG. 3.
Figure 5:
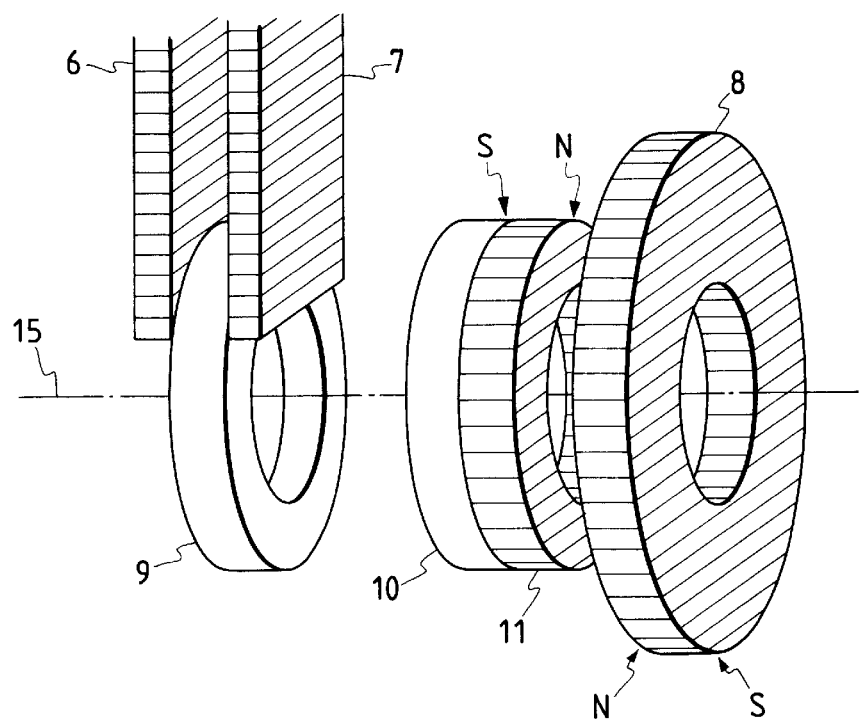
FIG. 5 is a partly enlarged drawing of the structure as shown in FIG. 3.

FIGS. 2A and 2B show details of the fixing means 1310.

Figure 6:
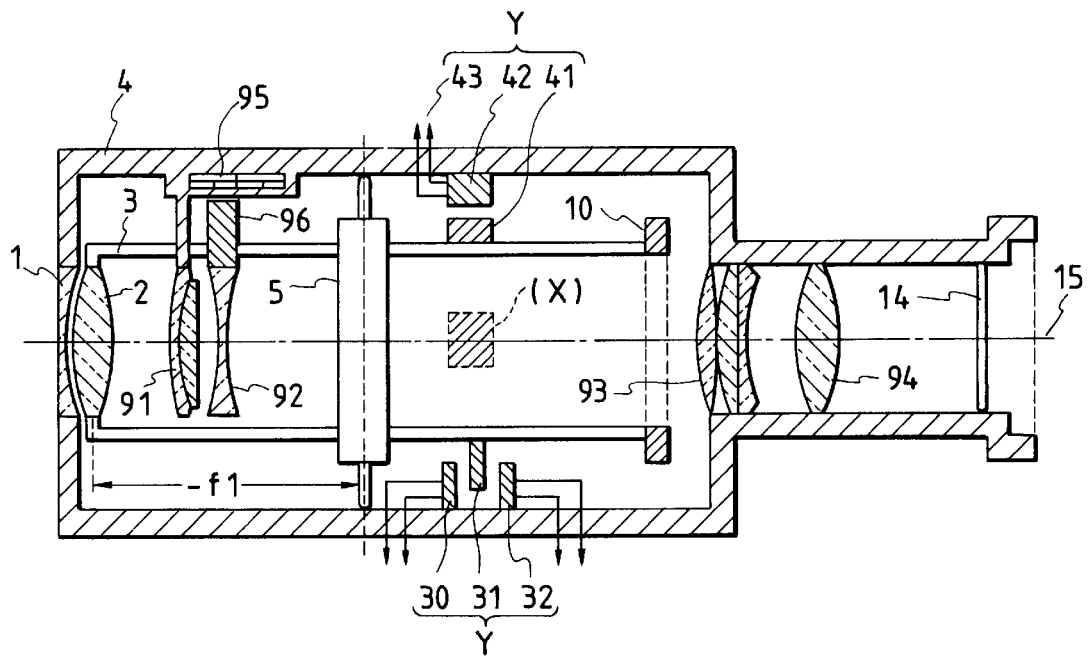
FIG. 6 is a sectional view to show an example of the imaging stabilizing device as disclosed in a prior application of the present applicant.

In FIGS. 2A and 2B, referential numeral 1401 denotes a motor for driving a fixing member, corresponding to the motor 1308 of FIG. 1. Numeral 1402 designates a member for fixing, rotatably held by unrepresented means on the barrel 4 of FIG. 6, 1403 a movable lens corresponding to the lens 2 which can deviate relative to the lens (fixed lens) 1 of the FIG. 6 in the correction optical system of pendulum type, and 1404 a protrusion for fixing.

In the above arrangement, a drive signal is supplied from the motor driver 1307 as shown in FIG. 1 to the motor 1401, so that the motor 1401 rotates in a direction of arrow 1406 in FIG. 2A. Then the fixing member 1402 rotates in a direction of arrow 1407 to bring thicker portions 1405 into contact with the fixing protrusions 1404 at three points, whereby the correction optical system of the pendulum type (movable lens) 1403 is fixed to the fixing member 1402, substantially fixed to the stationary barrel 4. Fig. 2B shows the condition of fixing, in which the correction optical system of the pendulum type (movable lens) 1403 is fixed to the fixing member 1402 by the fixing means 1310.

The operations of the comparator 1302, the low pass filter 1304, and the comparator 1305 of Fig. 1 may be readily carried out in the control circuit 50 comprising a micon, and the thus-processed signal is converted into an analog signal by the D/A converter 1301 to drive the motor 1304 (1401) through the motor driver 1307 to operate the fixing means 1310.

Further, it is possible that the fixing means 1310 may be operated through the motor driver 1307 and the motor 1308 (1401) based on the output of comparator 1302 of FIG. 1, that is, in response to whether the relative velocity between the correction optical system of the pendulum type and the barrel of the support member reaches a predetermined value.

Although deviation information is obtained in the present embodiment such that a relative angle deviation is detected between the correction optical means and the barrel as the fixed member, using the light emitting element, the light receiving element, and the slit screen, and that the detection value is differentiated to obtain the relative velocity, the deviation detecting means can be a sensor for detecting a deviation or angle deviation using an inertia member, or a sensor for directly detecting a velocity, an angular velocity, an acceleration, or an angular acceleration.

Although the mechanical lock means is employed to lock the correction optical means in the present embodiment electrical lock means may be also used similarly.

According to the present embodiment as described above, if the relative velocity between the correction optical system of the pendulum type and the barrel of the support member (fixed member) exceeds a predetermined value, or if the state of excess of the relative velocity is repeated more than predetermined times, the correction optical system of the pendulum type is fixed to the barrel. Then a large electric current is unnecessary to generate a great torque for centering to prevent the correction optical system from hitting the internal wall of the barrel, thereby obtaining a power-saving effect. Also, since the correction optical system of the pendulum type is thus secured to the barrel, the correction optical system may be effectively prevented from being broken by collision with the barrel.

What is claimed is:

1. An image blur prevention apparatus comprising:
    movable image blur prevention means for preventing an image blur by moving;
    locking means for fixing said image blur prevention means by contacting with at least a portion of said image blur prevention means;
    detection means for detecting a velocity state of said image blur prevention means; and
    control means for operating said locking means in response to the velocity state detected by said detection means.

2. An apparatus according to claim 1, wherein said movable image blur prevention means includes means for optically preventing the image blur.

3. An apparatus according to claim 2, wherein said image blur prevention means includes image blur prevention optical means for deflecting a light beam by moving in an optical path.

4. An apparatus according to claim 3, wherein said locking means includes means for fixing the image blur prevention optical means so that an optical axis of said image blur prevention optical means substantially coincides with an optical axis of the apparatus.

5. An apparatus according to claim 1, wherein said locking means includes a lock member for fixing said image blur prevention means by contacting with said image blur prevention means and includes driving means for shifting the state of the lock member from a non-fixing state in which said image blur prevention means is not fixed to a fixing state in which said image blur prevention means is fixed.

6. An apparatus according to claim 1, wherein said detection means includes means for detecting a relative velocity between said image blur prevention means and a fixing portion which is substantially fixed to the apparatus, and said control means includes means for controlling said locking means in accordance with relative velocity detected by said detection means.

7. An apparatus according to claim 6, wherein said control means includes means for causing said locking means to perform the locking operation in accordance with the relative velocity detected by said detection means being larger than a predetermined value.

8. An apparatus according to claim 1, wherein said control means includes means for causing said locking means to perform the locking operation in accordance with the velocity detected by said detection means reaching a predetermined value.

9. An apparatus according to claim 8, wherein said control means includes means for causing said locking means to perform the locking operation in accordance with the velocity detected by said detection means reaching the predetermined value in a predetermined time.

10. Optical apparatus comprising:
    movable image blur prevention means for preventing an image blur by moving;

locking means for fixing said image blur prevention means by contacting with at least a portion of said image blur prevention means;

detection means for detecting a velocity state of said image blur prevention means; and control means for operating said locking means in response to the velocity state detected by said detection means.

11. A control apparatus for an image blur prevention apparatus having movable image blur prevention means for preventing an image blur by moving so that a focus position of a light beam for forming an image is kept and having locking means for fixing the image blur prevention means by contacting with at least a portion of said image blur prevention means, comprising:

a control portion for operating the locking means in accordance with a velocity state of the image blur prevention means.

12. An apparatus according to claim 11, wherein said image blur prevention means includes image blur prevention optical means for deflecting a light beam by moving in an optical path.

13. An apparatus according to claim 11, wherein said locking means includes a lock member for fixing said image blur prevention means by contacting with said image blur prevention means and includes driving means for shifting the state of the lock member from a non-fixing state in which said image blur prevention means is not fixed to a fixing state in which said image blur prevention means is fixed.

14. An apparatus according to claim 11, wherein the control portion includes means for causing the locking means to perform a locking operation in accordance with the relative velocity between the image blur prevention means and the fixing portion.

15. A light beam deflection apparatus comprising:

light beam deflection means for deflecting a light beam by moving in an optical path;

locking means for fixing said light beam deflection means by contacting with at least a portion of said light beam deflection means;

detection means for detecting a velocity state of said light beam deflection means; and control means for operating said locking means in response to an output of said detection means.

16. An apparatus according to claim 15, wherein said light beam deflection means includes means for performing an image blur prevention operation by deflecting the light beam.

17. An apparatus according to claim 15, wherein said locking means includes a lock member for fixing said light beam deflection means by contacting with said light beam deflection means and includes driving means for shifting the state of the lock member from a non-fixing state in which said light beam deflection means is not fixed to a fixing state in which said light beam deflection means is fixed.

18. An apparatus according to claim 15, wherein said detection means includes means for detecting a relative velocity between said light beam deflection means and a fixing portion which is substantially fixed to the apparatus, and said control means includes means for causing said locking means to perform a locking operation for fixing said light beam deflection means in accordance with the relative velocity detected by said detection means.

19. An optical apparatus comprising:

light beam deflection means for deflecting a light beam by moving in an optical path;

locking means for fixing said light beam deflection means by contacting with at least a portion of said light beam deflection means;

detection means for detecting a velocity state of said light beam deflection means; and control means for operating said locking means in response to an output of said detection means.

20. A control apparatus for a light beam deflection apparatus having light beam deflection means for deflecting a light beam by moving in an optical path and having locking means for fixing the light beam deflection means by contacting with at least a portion of said light beam deflection means, comprising:

a control portion for operating the locking means in accordance with a velocity state of the light beam deflection means.

21. An apparatus according to claim 20, wherein said light beam deflection means includes means for performing an image blur prevention operation by deflecting the light beam.

22. An apparatus according to claim 20, wherein said locking means includes a lock member for fixing said light beam deflection means by contacting with said light beam deflection means and includes driving means for shifting the state of the lock member from a non-fixing state in which said light beam deflection means is not fixed to a fixing state in which said light beam deflection means is fixed.

23. An apparatus according to claim 20, wherein the control portion includes means for causing the locking means to perform the locking operation in accordance with the relative velocity between the light beam deflection means and the fixing portion.

* * * * *

UNITED STATES PATENT AND TRADEMARK OFFICE
CERTIFICATE OF CORRECTION

PATENT NO. : 5,771,069
DATED : June 23, 1998
INVENTOR(S) : Takashi Kobayashi

It is certified that error appears in the above-identified patent and that said Letters Patent is hereby corrected as shown below:

Col. 1, line 17, delete "2959088 and insert -- 2,959,088 --.

Col. 4, line 22, after "i.e." insert -- , --.

Col. 9, line 23, after "i.e." insert -- , --.

Col. 1, line 17, delete "2829557" and insert -- 2,829,557 --.

Signed and Sealed this

Second Day of February, 1999

Attest:

Attesting Officer

*Acting Commissioner of Patents and Trademarks*